United States Patent
Kim et al.

(10) Patent No.: US 8,733,795 B2
(45) Date of Patent: May 27, 2014

(54) ANCHOR PRE-TENSIONER FOR SAFETY SEAT BELT

(71) Applicant: Hyundai Motor Company, Seoul (KR)

(72) Inventors: Si Yeol Kim, Suwon-si (KR); Choong Sik Shin, Anyang-si (KR); Sung Jun Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/706,052

(22) Filed: Dec. 5, 2012

(65) Prior Publication Data

US 2014/0061352 A1    Mar. 6, 2014

(30) Foreign Application Priority Data

Aug. 30, 2012   (KR) ................ 10-2012-0095509

(51) Int. Cl.
   *B60R 22/36* (2006.01)
   *B60R 22/195* (2006.01)

(52) U.S. Cl.
   CPC ......... *B60R 22/1952* (2013.01); *B60R 22/1955* (2013.01)
   USPC ...................................... 280/806

(58) Field of Classification Search
   CPC ............ B60R 22/1952; B60R 22/1955; B60R 22/4628
   USPC ................. 280/806; 297/480; 60/632, 635
   See application file for complete search history.

(56) References Cited

U.S. PATENT DOCUMENTS

| | | | | |
|---|---|---|---|---|
| 5,588,677 A | * | 12/1996 | Kopetzky et al. | 280/806 |
| 5,944,350 A | * | 8/1999 | Grabowski et al. | 280/806 |
| 6,039,353 A | * | 3/2000 | Bauer et al. | 280/806 |
| 6,866,296 B2 | * | 3/2005 | Webber et al. | 280/806 |
| 7,631,899 B2 | * | 12/2009 | Nakayama et al. | 280/805 |
| 7,887,096 B2 | * | 2/2011 | Kohama | 280/806 |
| 2002/0185852 A1 | * | 12/2002 | Nakano et al. | 280/806 |
| 2003/0090101 A1 | * | 5/2003 | Ennerdal | 280/806 |
| 2003/0122362 A1 | * | 7/2003 | Ukita et al. | 280/806 |
| 2004/0094946 A1 | * | 5/2004 | Prentkowski | 280/806 |
| 2006/0279077 A1 | * | 12/2006 | Nakano et al. | 280/806 |
| 2007/0029775 A1 | * | 2/2007 | Tomita | 280/806 |
| 2009/0115179 A1 | * | 5/2009 | Zasu et al. | 280/806 |
| 2009/0261569 A1 | * | 10/2009 | Bok et al. | 280/806 |

FOREIGN PATENT DOCUMENTS

KR    1020080017720 A    2/2008

* cited by examiner

*Primary Examiner* — Paul N Dickson
*Assistant Examiner* — Robert A Coker
(74) *Attorney, Agent, or Firm* — Morgan, Lewis & Bockius LLP

(57) ABSTRACT

An anchor pre-tensioner for seat belt of vehicle improves phenomenon in which a webbing of seat belt is caught in belly of passengers during collision by the vehicle. The anchor pre-tensioner may include: first second wires connected to a lower end of the webbing respectively; a driving cylinder having a piston coupled to ends of the first and second wires; a gas generator supplying a gas pressure for the forward movement of the piston; a first roller supporting the first wire to move in the direction oblique against the bottom of the vehicle during the forward movement of the piston; and a second roller supporting the second wire to move downward when the piston moves forward; wherein the forward movement of the piston pulls the webbing of the seat belt in the direction where the first wire moves and at the same time in the direction perpendicular thereto.

3 Claims, 5 Drawing Sheets

ANCHOR PRE-TENSIONER FOR SAFETY SEAT BELT

CROSS-REFERENCE TO RELATED APPLICATION

The present application claims priority of Korean Patent Application Number 10-2012-0095509 filed Aug. 30, 2012, the entire contents of which application is incorporated herein for all purposes by this reference.

BACKGROUND OF INVENTION

1. Field of Invention

The present invention relates to an anchor pre-tensioner for a safety seat belt of a vehicle, and more particularly, to an improved anchor pre-tensioner for a safety seat belt of a vehicle to prevent a webbing of a safety seat belt from being caught in the passenger's belly in collision.

2. Description of Related Art

In general, a vehicle has seat belts to prevent a driver and passengers from injuries due to external shock such as a collision. The seat belt protects a driver and passengers from collision energy of a vehicle alone, but has a major role of protecting the passengers safely with the assistance of an airbag system.

In order to ensure the safety of passengers who habitually wear a seat belt in an inappropriate way, for example, a loose seat belt, the seat belt is provided with an anchor pre-tensioner which is effective to remove webbing slack of the seat belt, in addition to a retractor pre-tensioner.

The anchor pre-tensioner of a seat belt is a device to apply a preset tension to the seat belt, when a vehicle collides, to remove webbing slack, to enhance the initial restraint ability of the seat belt such that a restraint system may effectively absorb collision energy.

A submarine phenomenon occurs on the seat belt in the collision of a vehicle. The submarine phenomenon generally refers to phenomenon that a dummy is moved down relatively from the seat belt. There are several problems during the submarine phenomenon; one of them is a phenomenon that a webbing of the seat belt moves relatively upward by the downward movement of the dummy and thus is caught in the belly, namely, a phenomenon of the webbing of a seat belt caught in the belly. This submarine phenomenon frequently occurs to a 5%ile dummy having the small pelvis and the low belly.

North American NCAP estimates a vehicle from 11MY (Year of Make) in the front collision under the conditions where a 5%ile female dummy is seated on the passenger seat, whereas Korea has a plan of performing the estimation from 2013 and Europe from 2015 to reinforce safety of a vehicle. Moreover, China conducts the estimation of a vehicle under the conditions where a 5%ile dummy is seated on the rear passenger seat in NCAP from 2012, while reflecting whether not only injury but the submarine phenomenon occur to the estimation.

The drawbacks of the submarine phenomenon, that is, the webbing of the seat belt caught in the belly occurs when, in the collision, the webbing of the seat belt moves upward and from the pelvis of the dummy to the belly excessively and presses the belly without muscles and bones, resulting in excessively pressing the belly. Seating of the webbing on the belly of weak rigidity brings the pelvis of the dummy to move farther so that laps of the dummy may be injured more seriously and that unstable mobility of the upper part of the dummy may bring an unexpected mobility of the dummy, and that the belly pressure may bring the rupture of the internal organs and the like in actual collision accident.

There are essential factors of the phenomenon that the webbing of the seat belt is caught in the belly such as acceleration of a vehicle itself, a pitch angle (a pitch angle when a large portion of the webbing is caught in the belly), an intersection of the anchor pre-tensioner of the seat belt and buckle height, and cushion stiffness of a seat.

Thus, the factors must be improved for the enhancement of the caught webbing of the seat belt in the belly, but there are several difficulties as follows:

Acceleration of a vehicle among the factors is measured by an acceleration sensor mounted in the vehicle at the collision and affected by overall properties of the vehicle such as the body structure, the chassis structure, engine size, etc. The caught webbing of the seat belt in the belly may be enhanced by changing the acceleration. However, it is actually difficult to enhance the caught webbing of the seat belt in the belly because the change needs serious modification in the vehicle structure.

The pitch angle of a vehicle refers to an angle of lift and rotation of the rear side of a vehicle in the collision and is affected by the overall properties such as the body structure, the chassis structure, the engine size, etc. of the vehicle. The improvement of the body structure may enhance the caught webbing of the seat belt in the belly partially but acceleration and deceleration of the vehicle body are inferior.

The APT intersection of the seat belt is determined as a relative position between a mounting position of the anchor pre-tensioner and the dummy. Since the anchor pre-tensioner is usually arranged by a B-pillar and must secure the mounting space, it is difficult to change the mounting position due to interference between parts when the mounting position is determined. It is difficult to change the mounting position of the dummy because the mounting position thereof is determined by an interior package.

It is relatively easy to change the buckle height of the seat belt but there is possibility of deterioration due to inconvenience in use of the buckle when the buckle height is reduced for the enhancement of the caught webbing of the seat belt in the belly.

Moreover, it is difficult to change the cushion stiffness of the seat and the increased cushion stiffness deteriorates the ride comfort.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for an anchor pre-tensioner for a safety seat belt of a vehicle in which a webbing is restricted by pulling in the direction inclined to the bottom of the vehicle with a first wire and a restriction force of pulling the webbing downward is generated using a second wire to increase intersection of the anchor pre-tensioner artificially so that the webbing of the seat belt is prevented from being caught in the belly of a passenger.

Various aspects of the present invention provide for an anchor pre-tensioner for a seat belt of a vehicle, including: a first wire and a second wire connected to a lower end of a webbing of the seat belt respectively; a driving cylinder having a piston coupled to ends of the first and the second wires; a gas generator supplying a gas pressure for the forward movement of the piston; a first roller supporting the first wire to move in the direction oblique against the bottom of the vehicle when the piston moves forward; and a second roller supporting the second wire to move in the downward direction when the piston moves forward; wherein the forward movement of the piston during a vehicle collision pulls the webbing of the seat belt in the direction where the first wire moves and at the same time in the direction perpendicular thereto.

The driving cylinder may include a ball stopper preventing the piston from moving rearward, and the gas generator is configured to move the piston with explosive force of gunpowder exploded by a signal from an anchor pre-tensioner control unit (ACU) detecting the collision by the vehicle.

According to above-described the anchor pre-tensioner, slack of a webbing may be removed during the collision by a vehicle to improve a force restraining a passenger by the seat belt and to increase the intersection of the anchor pre-tensioner by pulling the webbing downward in comparison to the existing anchor pre-tensioner so that the webbing may be prevented from being caught in the belly of a passenger.

As such, the anchor pre-tensioner can improve safety of a passenger during a vehicle collision and increase efficiency for the development in vehicle collision performance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
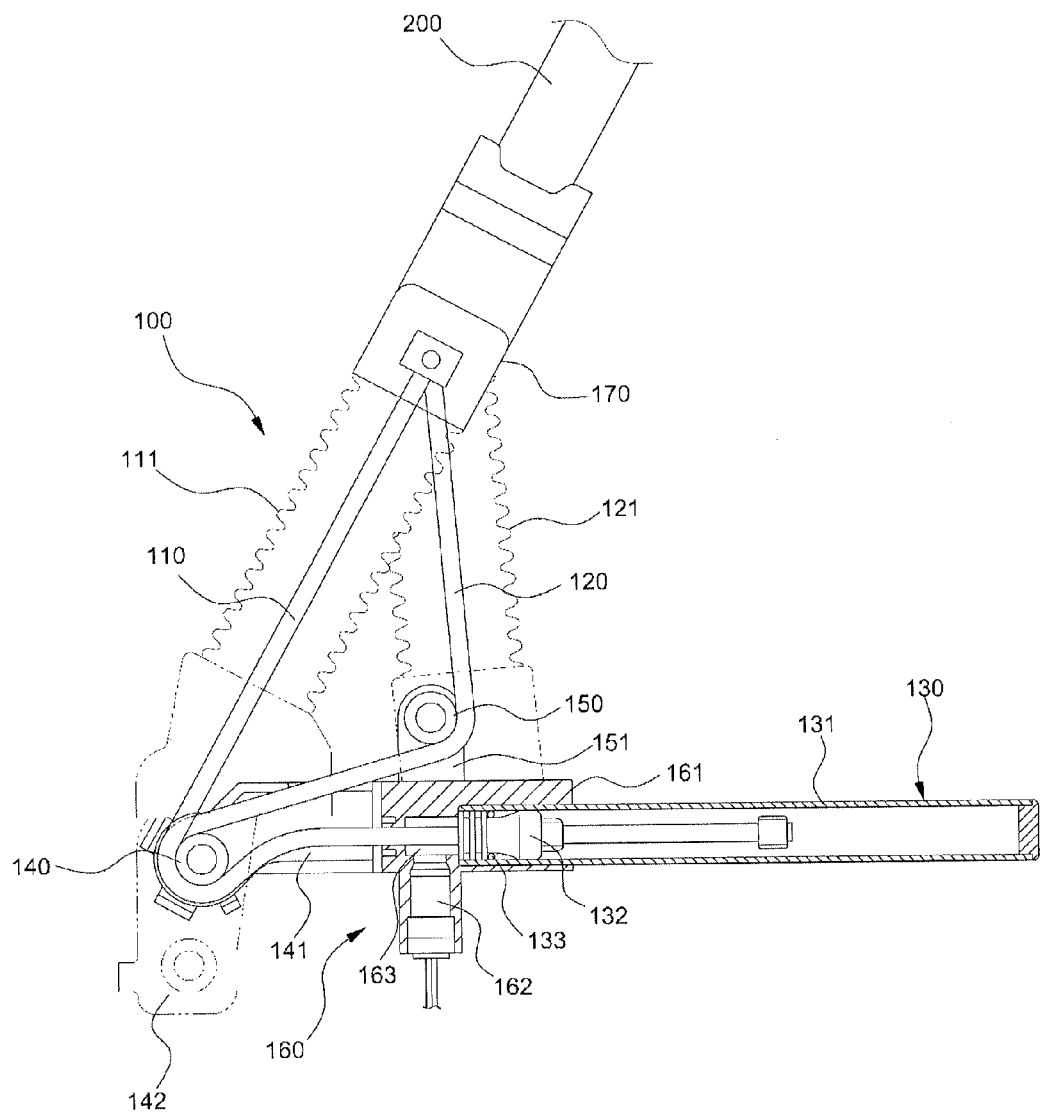
FIG. 1 is a view schematically illustrating an exemplary anchor pre-tensioner for a seat belt of a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an anchor pre-tensioner for a seat belt which is mounted to an existing anchor unit (which fixes a lower end of a webbing to the bottom of a vehicle and supports the same when the anchor pre-tensioner is not mounted) to fix a lower end of a webbing of the seat belt to the bottom of a vehicle and to support the same, and a main aspect of the present invention is to increase an anchor pre-tensioner intersection angle (hereinafter, referred to as an 'intersection') during an operation of the anchor pre-tensioner, resulting in improving a phenomenon in which a webbing of a seat belt is caught by a belly.

Thus, according to the present invention, a webbing of a seat belt is pulled in a direction inclined against the bottom of a vehicle and pulled downward at the same time to be restrained by using two wires during a collision of the vehicle so that the webbing is prevented from being caught by the belly of a passenger by intentionally increasing an intersection during an operation of the seat belt.

As illustrated in FIG. 1, an anchor pre-tensioner 100 for a seat belt according to various embodiments of the present invention is connected to a lower end of a webbing 200 of a seat belt for a vehicle to pull the webbing 200, and includes a first wire 110 and a second wire 120, which are connected to a lower end of the webbing 200, a driving cylinder 130 having a piston 132 integrally coupled to ends of the first and second wires 110 and 120, a first roller 140 for supporting the first wire 110 such that the first wire 110 is moved in a direction inclined against the bottom of the vehicle, and a second roller 150 for supporting the second wire 120 such that the second wire 120 is moved in a downward direction of the vehicle.

The first wire 110 and the second wire 120 connect the lower end of the webbing 200 with the piston 132, to pull the webbing 200 when the piston 132 is moved forward, and are installed in the driving cylinder 130 while ends thereof are coupled to the piston 132.

The driving cylinder 130 includes a hermetically sealed cylinder 131, a piston 132 installed in the cylinder 131 to be linearly moved, and a ball stopper 133 for preventing a rearward movement of the piston 132.

A gas generator 160 for generating and supplying a gas pressure for a forward movement of the piston 132 is connected to a rear end of the cylinder 131.

The gas generator 160 is operated in response to a signal from an anchor pre-tensioner control unit (ACU), and generates a gas pressure by using an explosive force of gunpowder which explodes in response to a firing signal from the ACU detecting a collision by the vehicle, and makes the piston 132 move forward due to the generated gas pressure.

For instance, the ACU receives a collision signal from the collision sensor for detecting collision by a vehicle and thus recognizes the collision occurs.

For example, the gas generator 160 may include gunpowder which is exploded by an ignition agent connected to the ACU to generate a gas pressure, a gunpowder storage 162 for storing the gunpowder, and a base cartridge 161 accommodating the gunpowder storage 162. The base cartridge 161 has a hollow portion 163 through which a gas pressure generated during the explosion of the gunpowder flows and is connected to the cylinder 131 such that gas can flow between the base cartridge 161 and the cylinder 131, so that the gas pressure generated by a large amount of gas and calories generated during the exposition of the gunpowder is fed into the piston 132 and the cylinder 131 to move the piston 132 forward.

When the anchor pre-tensioner 100 is driven to move the piston 132 forward and the webbing 200 of the seat belt is pulled, a slack of the webbing 200 is removed and an initial restraint force is improved so that the movement of the pelvis of the dummy decreases resulting in mitigating injury of the knees and guaranteeing stable mobility of the upper body of a passenger.

The ball stopper 133 is circumscribed on the oblique surface of the piston 132 and the inner circumference of the cylinder 131. The ball stopper 133 moved together the piston 132 during the forward movement of the piston 132 and is caught between the oblique surface of the piston 132 and the inner circumference of the cylinder 131 during the rearward movement of the piston 132 to prevent the piston 132 from moving rearward, resulting in preventing reverse tensions of the wires 110 and 120.

The first roller 140 and the second roller 150 are rotatably mounted outside the cylinder 131 by a first mounting bracket 141 and a second mounting bracket 151, respectively.

For the mounting at a side of the driving cylinder 130, the first roller 140 is arranged at a position for generating a movement route of the first wire 110 in the direction oblique against the bottom of a vehicle, whereas the second roller 150 is arranged at a position for generating the movement route of the second wire 120 in the downward direction of the vehicle.

As illustrated in FIG. 1, the first roller 140 is disposed at the rear end of the driving cylinder 130 and the first wire 110 is supported by the first roller 140 to generate the movement route oblique against the bottom of a vehicle, resulting in pulling the webbing 200 during the collision by a vehicle and thus in removing slack of the webbing.

The second roller 150 is disposed at the upper end of the base cartridge 161 or the driving cylinder 130 and the second wire 120 is supported by the second roller 150 to generated the downward movement route of a vehicle, resulting in pulling the webbing 200 during the collision by a vehicle such that the webbing moves downward relatively than the existing one to prevent the webbing from being caught by the belly of a passenger.

Figure 2:
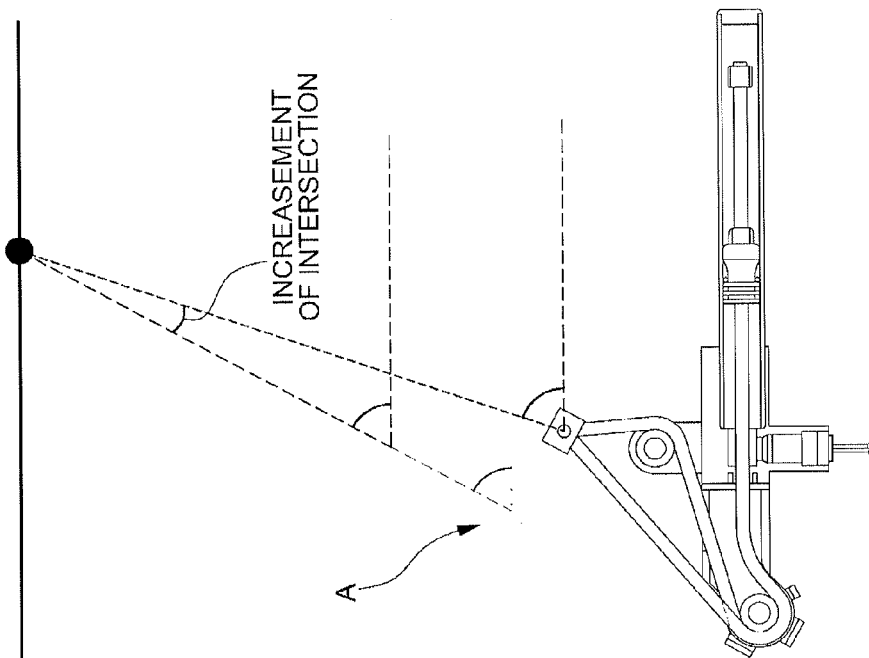
FIG. 2 is a view schematically illustrating an operation of the anchor pre-tensioner for a seat belt according to the present invention.
Figure 2:
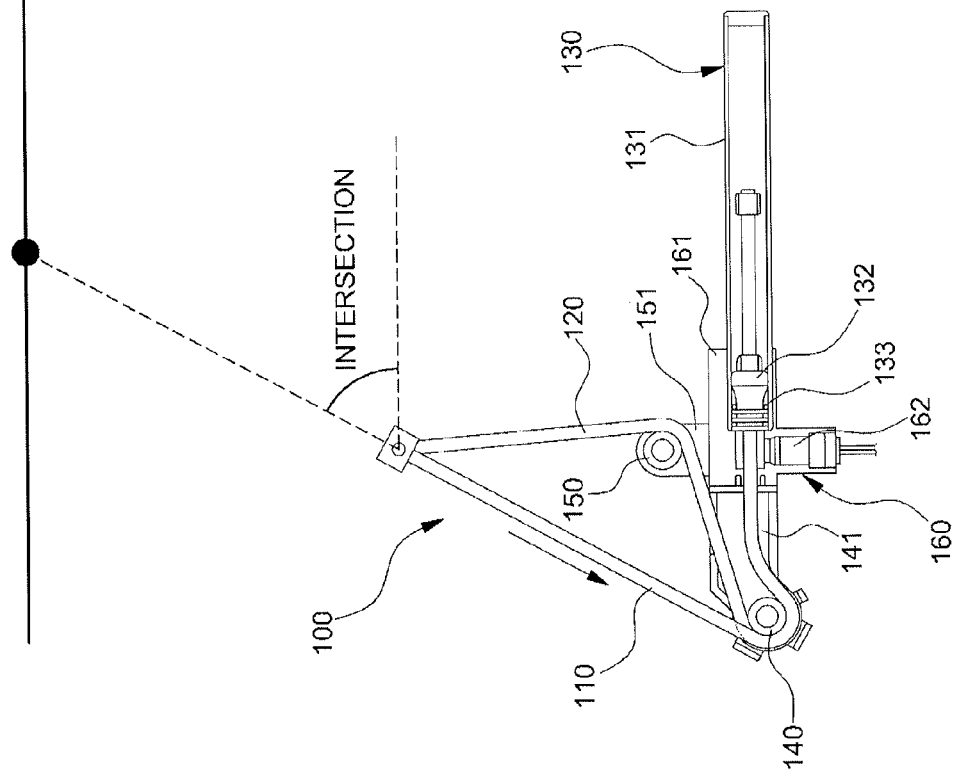

Specifically, some of a force applied to the webbing 200 when a tension is applied to the second wire 120 restrains (or pulls) the webbing in the direction perpendicular to the pulling force by the first wire 110, so that, as illustrated in FIG. 2, the webbing 200 of the seat belt is pulled in the oblique direction and in the downward direction by the second wire 120 and rotates about the first roller 140 at the same time, resulting in increasing the intersection.

Figure 3:
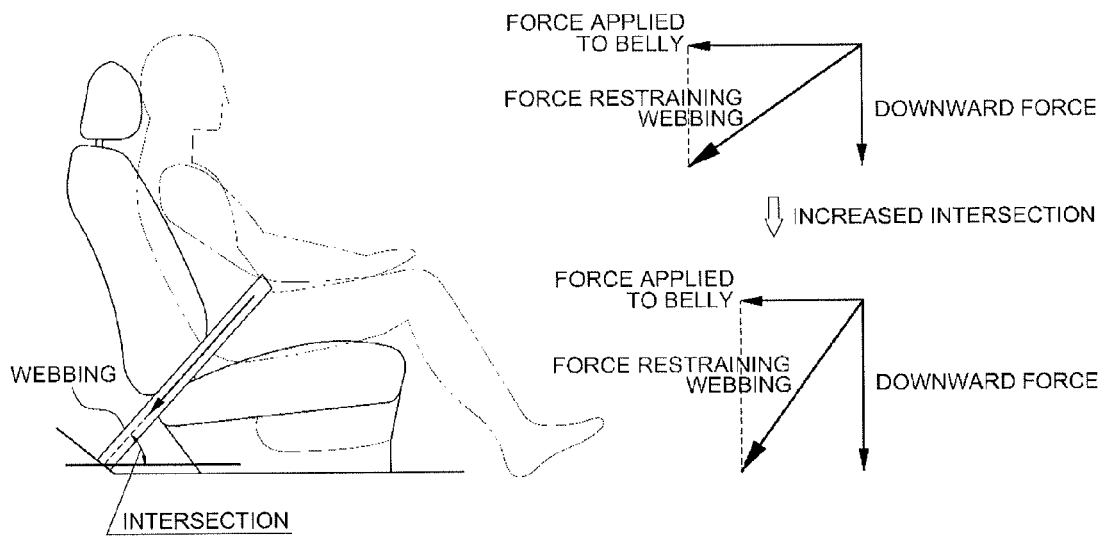
FIG. 3 is a view schematically illustrating that a force applied to the belly of a passenger decreases when the intersection increases.

As illustrated in FIG. 3, in the case of the increased intersection, the restrain force (or load) by the webbing applied to the belly decreases to prevent the webbing from being caught in the belly of a passenger.

In this case, the second wire 120 is moved with being supported by the second roller 150, is supported by the first roller 140, and is guided to the driving cylinder 130, and finally is coupled to the piston 132 together the first wire 110.

The first wire 110 and the second wire 120 are disposed in a first accordion hose 111 and a second accordion hose 121 which are compressed and restored in the longitudinal direction, respectively, and a link unit 170 at which ends of the wires 110 and 120 and the lower end of the webbing 200 are coupled to the upper ends of the accordion hoses 111 and 121 is provided such that the webbing is pulled as the wires 110 and 120 are pulled.

The first roller 140 is rotatably mounted between the first mounting bracket 141 and an auxiliary mounting bracket 142 which is mounted to the rear side of the first mounting bracket 141, and the first accordion hose 11 is seated on and fixed to the upper end of the auxiliary mounting bracket 142. The second accordion hose 121 is seated on and fixed to the upper end of the base cartridge 161 or the cylinder 131.

The first accordion hose 111 and the second accordion hose 121 are coupled to the right and the left sides or the front and the rear sides of the link unit 170 at the same time to avoid the interference therebetween.

In addition, the mark by 'A' of FIG. 2 indicates the operation of the anchor pre-tensioner when the second wire 120 is removed from the anchor pre-tensioner 100 according to various embodiments of the present invention, and in this case, the downward pulling force by the second wire 120 does not apply so that it is effective to increase the intersection according to various embodiments of the present invention.

According to the anchor pre-tensioner for a seat belt according to various embodiments of the present invention, the intersection increases during the anchor pre-tensioner so that deceleration and acceleration of a vehicle body, and the ride comfort, other deteriorations may be improved and that it may be prevented the webbing of the seat belt from being caught in the belly without any structural interference.

Figure 4:
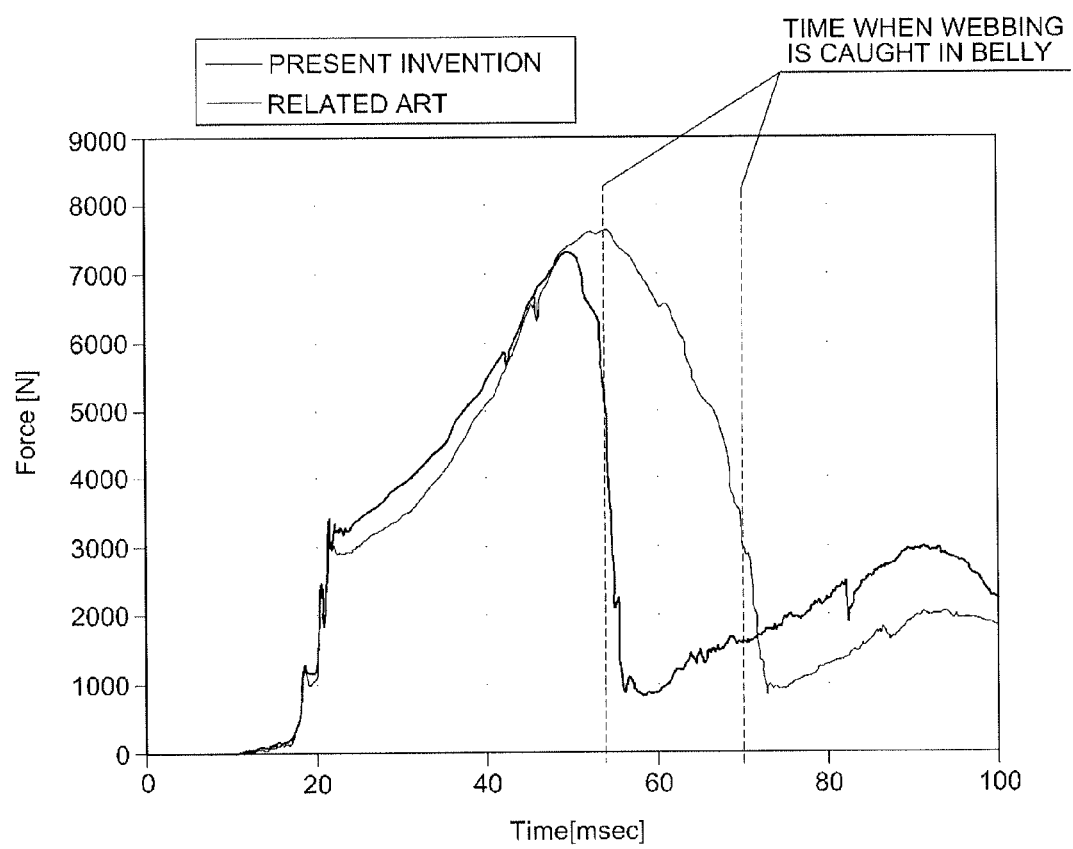
FIG. 4 is a graph illustrating a load when a webbing of a seat belt restrains a dummy during a collision test of a vehicle.
Figure 5:
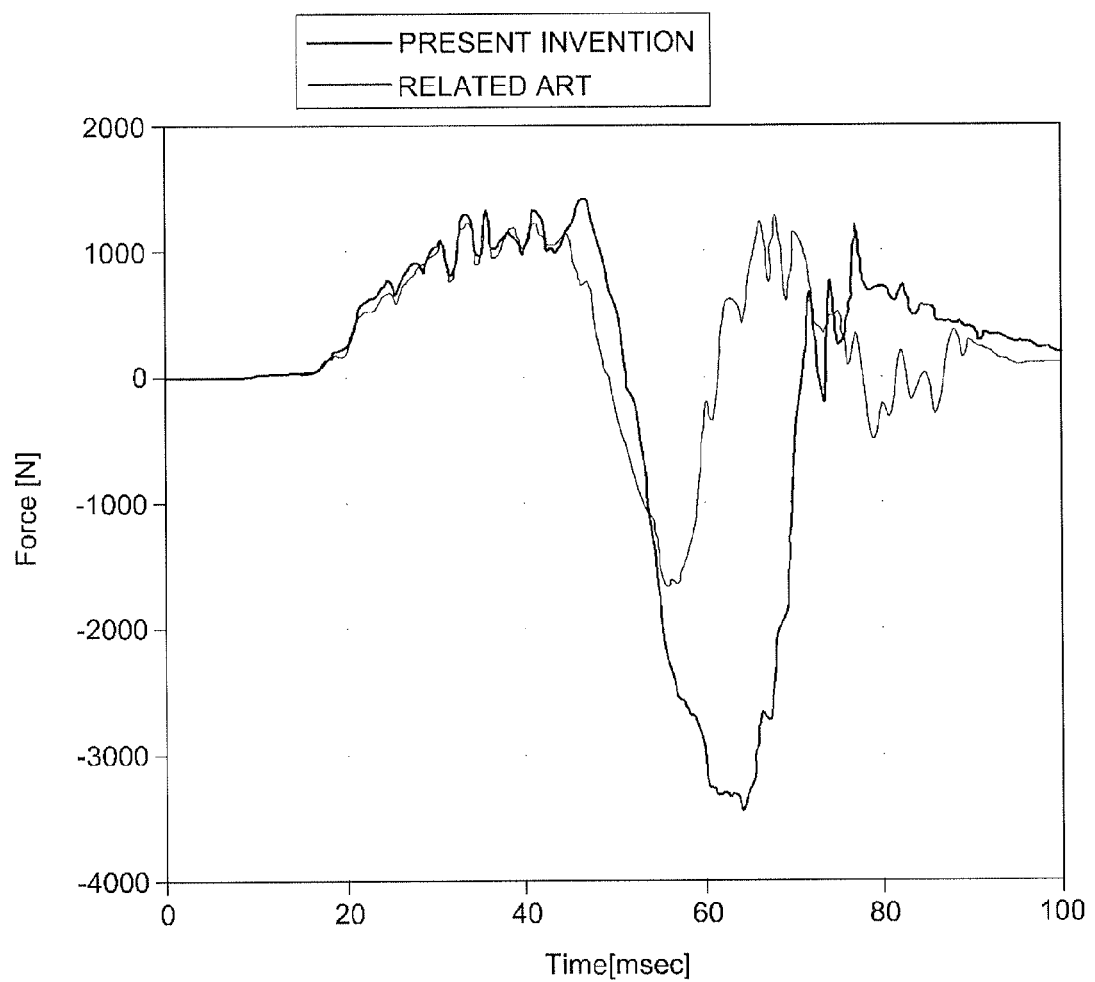
FIG. 5 is a graph illustrating a load of a webbing of a seat belt applied to the right thigh of a dummy during a collision test of a vehicle.

Meanwhile, for the confirmation of the effect caused by the increase of the intersection, measuring tests for the webbing restrain forces by seat belts, times when the webbing is caught in the belly, and loads applied to thighs and laps with the anchor pre-tensioner according to the present invention and the existing anchor pre-tensioner are carried out and the measured results are illustrated in FIGS. 4 and 5 and as listed in Table 1 below.

In this case, used is an anchor pre-tensioner pulling and restraining a webbing of a seat belt only in the oblique direction against the bottom of a vehicle using a single wire as an existing anchor pre-tensioner.

TABLE 1

|  | Time caught in the belly | Injury affection | Mobility of upper body |
|---|---|---|---|
| Related art | 53 msec | 3.42 kN of load to laps | unstable |
| Present invention | 69 msec | 1.64 kN of load to laps | Stable |

As illustrated in FIGS. 4 and 5 and Table 1, it can be understood that the time when the webbing is caught in the belly is later, that the load applied to thighs and laps decreases, and that mobility of the upper body of a passenger is stable when the anchor pre-tensioner according to the present invention is applied, in comparison to when the existing anchor pre-tensioner is applied.

The later the time when the webbing of a seat belt is caught in the belly during the collision by a vehicle is the less the impact applied to a dummy is and the impact applied to the dummy by the webbing is insignificant when the webbing is caught in the belly later than 65 msec.

Thus, the impact by the webbing of a seat belt to a passenger as the intersection of an anchor pre-tensioner increases, particularly a force applied to the belly of a passenger is remarkably reduced.

Meanwhile, FIG. 4 is a graph illustrating a load when a webbing of a seat belt restrains a dummy during a collision test of a vehicle, and FIG. 5 is a graph illustrating a load of a webbing of a seat belt applied to the right thigh of a dummy during a collision test of a vehicle.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An anchor pre-tensioner for a seat belt of a vehicle, comprising:
    a first wire and a second wire, each having a first end directly connected to a lower end of a webbing of the seat belt, respectively;
    a driving cylinder having a piston directly coupled to respective second ends of the first and the second wires;
    a gas generator supplying a gas pressure for the forward movement of the piston;
    a first roller supporting the first wire to move in the direction oblique with respect to a bottom of the vehicle when the piston moves forward; and
    a second roller supporting the second wire to move in a downward direction as the piston moves forward;
    wherein the first wire is disposed to move while being supported by the first roller; and
    wherein the second wire is disposed to move while being supported by the second roller and the first roller, and is guided to the driving cylinder, and finally is coupled to the piston together the first wire such that the forward movement of the piston during a vehicle collision pulls the webbing of the seat belt in a direction where the first wire moves and at the same time in a direction perpendicular thereto.

2. The anchor pre-tensioner of claim 1, wherein the driving cylinder comprises a ball stopper preventing the piston from moving rearward.

3. The anchor pre-tensioner of claim 1, wherein the gas generator is configured to move the piston with explosive force of gunpowder exploded by a signal from an anchor pre-tensioner control unit (ACU) detecting a vehicle collision.

* * * * *